United States Patent [19]

Smith et al.

[11] 4,374,593
[45] Feb. 22, 1983

[54] TOWBAR ASSEMBLY

[75] Inventors: Roger R. Smith, Lapeer; James L. Celentino, Oakland, both of Mich.

[73] Assignee: The United States of America as represented by the Secretary of the Army, Washington, D.C.

[21] Appl. No.: 266,223

[22] Filed: May 22, 1981

[51] Int. Cl.³ .............................................. B60D 1/14
[52] U.S. Cl. ................................ 280/491 E; 172/677; 280/493; 280/504; 294/82 AH
[58] Field of Search ........... 280/491 R, 491 A, 491 E, 280/490 R, 490 A, 493, 503, 504, 402, 491 B, 491 C, 491 D, 491 E, 475, 478 R, 478 A, 478 B; 294/82 AH, 74; 52/644, 655; 24/241 SB, 305; 172/677, 678, 679, 680

[56] References Cited

U.S. PATENT DOCUMENTS

| | | | |
|---|---|---|---|
| 1,479,182 | 1/1924 | Jeschke | 280/493 X |
| 2,092,593 | 9/1937 | Seys | 280/493 |
| 3,492,022 | 1/1970 | Hansen | 280/491 E X |
| 3,938,830 | 2/1976 | Lane | 280/491 R X |

FOREIGN PATENT DOCUMENTS

| | | | |
|---|---|---|---|
| 272060 | 3/1914 | Fed. Rep. of Germany | 280/504 |
| 806862 | 7/1935 | France | 280/491 E |
| 646658 | 10/1962 | Italy | 280/491 E |
| 509468 | 8/1976 | U.S.S.R. | 280/491 E |

*Primary Examiner*—Joseph F. Peters, Jr.
*Assistant Examiner*—M. J. Hill
*Attorney, Agent, or Firm*—Peter A. Taucher; John E. McRae; Nathan Edelberg

[57] ABSTRACT

A towbar assembly wherein two individual towbars are arranged in a V-configuration between a towing vehicle and a towed vehicle. The leading ends of the towbars have special end connectors that hook around a single towing pintle so that each towbar carries approximately the same tensile loading irrespective of changes in vehicle pitch or roll attitude. Each towbar is essentially independent of the other towbar, whereby the towbar loadings are essentially in the direction of the bar longitudinal axis; bending forces are to a great extent eliminated. The invention is designed primarily for use in towing large heavy vehicles weighing in excess of fifty tons.

7 Claims, 9 Drawing Figures

TOWBAR ASSEMBLY

GOVERNMENT INTEREST

The invention described herein may be manufactured, used, and licensed by or for the Government for governmental purposes without payment to us of any royalty thereon.

BACKGROUND AND SUMMARY OF THE INVENTION

This invention relates to a towbar assembly in which two individual towbars are arranged in a V-configuration between the towing vehicle and the towed vehicle. The invention can be used in various vehicle environments. However, it was particularly devised for use on relatively heavy vehicles, such as military tanks weighing on the order of fifty tons.

Each individual towbar includes a tube constituting the major portion of the towbar length, and end connectors affixed to the tube ends. An aim of the invention is to design the end connectors on each towbar so that each towbar is substantially identically loaded, at least when the vehicles are moving in the straight-ahead direction. This is accomplished primarily by designing the front end connectors so that they can simultaneously fit onto a single towing pintle carried by the towing vehicle. Each front end connector is a flat plate having a circular opening therethrough sized to fit over the towing pintle; one face of the plate area surrounding the circular opening is transversely curved so that when the front end connectors on individual towbars are positioned on the pintle the noncurved flat plate faces mate together, while the curved faces engage the pintle surface in nonbinding fashion. The curved surface engagement between the towbar end connectors and pintle permits the towbars to swivel around the pintle in a side-to-side direction and also in a vertical up-down direction. The individual towbars are subjected to minimal load changes when the vehicles change attitude or direction.

A second aim of our invention is to design the towbar end connectors so that each towbar tube is loaded essentially in tension or compression, without any oblique loadings that would produce bending stresses in the tubes. By confining the towbar loadings to tension or compression loadings, it becomes possible to reduce the tube wall thickness and tube weight. For heavy vehicle situations, such as military tanks, the individual towbar weight is of some importance as regards to cost and effect on vehicle payload, as well as easier handling by an individual when making or unmaking the connections between vehicles. In battlefield situations, the time required to achieve towbar hook-up of a disabled tank to a towing tank may be an important consideration. We achieve towbar weight reduction by making each individual towbar separate from the other towbar, and also by the above-discussed end connector design for confining the loadings to tensile loadings or compression loadings.

A further aim of our invention is to simplify the towbar-vehicle connection mechanisms insofar as possible without having to completely redesign the attachment mechanisms used on existing vehicles, especially military tanks now in the field. Our towbar design is compatible with existing towing pintle-hook construction found on present U.S. Army tanks, e.g., the M-60 tank.

THE DRAWINGS

Figure 1:
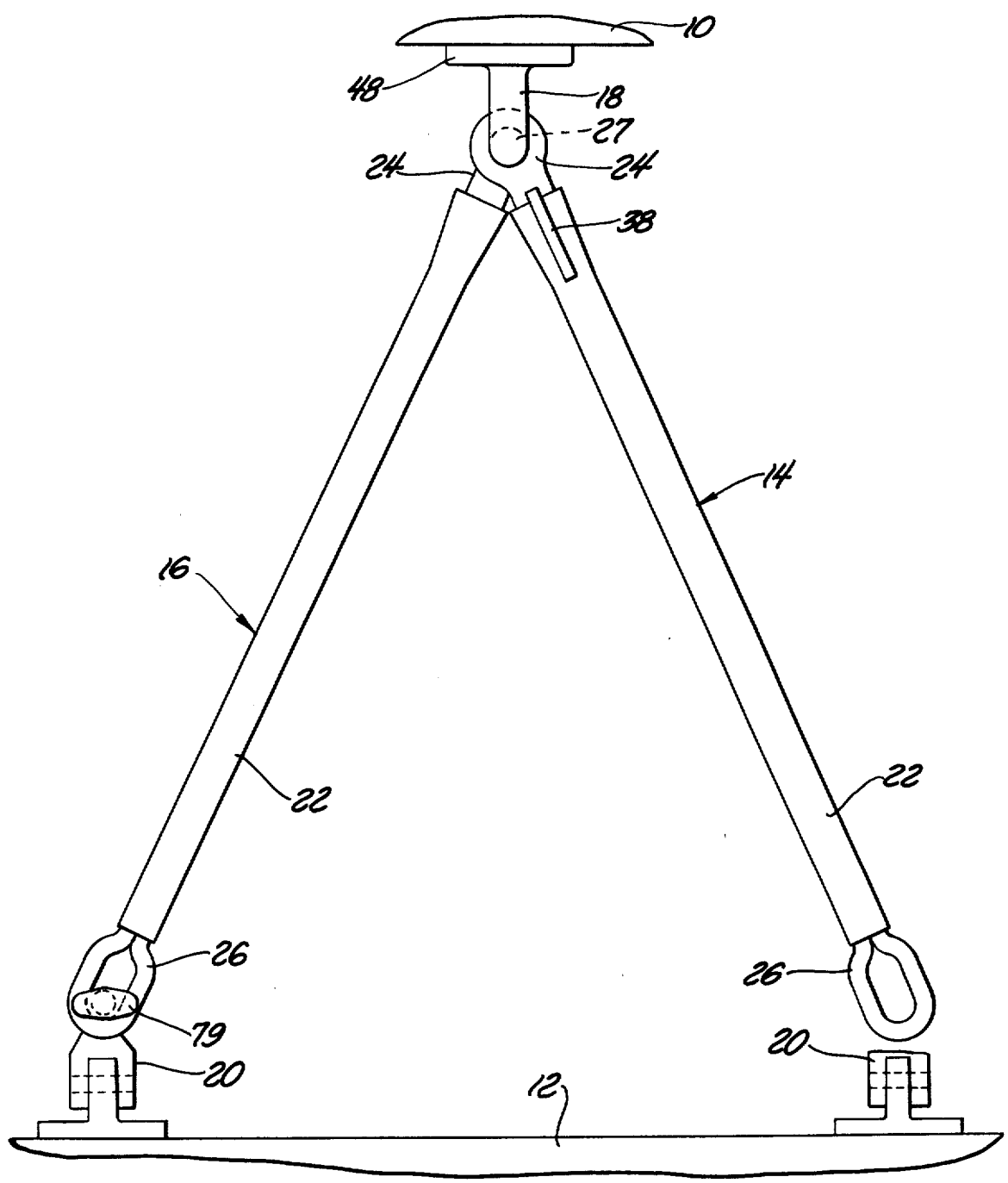
FIG. 1 is a top plan view of a towbar arrangement embodying our invention.

Referring in greater detail to FIG. 1, there is shown a tow-bar assembly arranged between the rear end 10 of a towing vehicle and the front end 12 of a towed vehicle. In practice each vehicle can be a tracked military vehicle used by the U.S. Army under the designation M-60; such vehicles weigh approximately fifty tons each. The towbar assembly is required to be of sufficient strength to handle the towing loads under various conditions of vehicle turning, acceleration, pitching, rolling, etc.

The towbar assembly comprises two identical towbars 14 and 16 arranged in a V-configuration between a towing pintle 18 attached to the rear end of the towing vehicle and to laterally-spaced hooks 20 permanently attached to the front end of the towed vehicle; one of hooks 20 is shown broken away to illustrate towbar end connector configuration. Each towbar comprises an elongated tube 22 constituting the major portion of the towbar length, a front eye member or end connector 24, and a rear eye member or end connector 26. The front eye members 24 on individual towbars overlap one another so that both of them fit the upstanding pin portion 27 of towing pintle 18.

Figure 3:
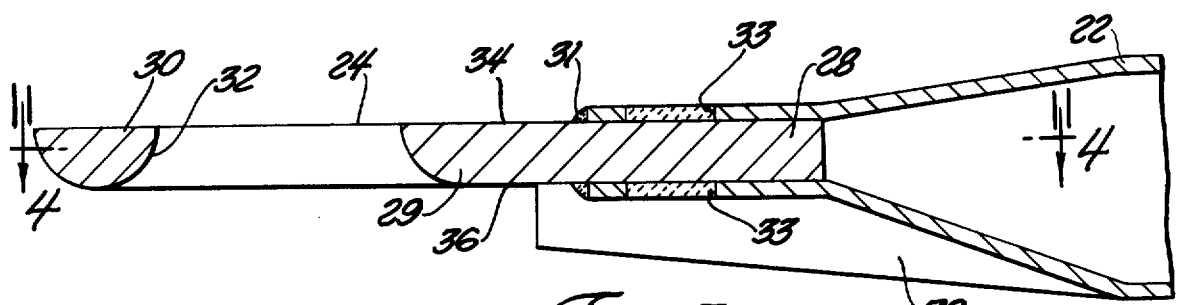
FIGS. 3 and 4 illustrate structural detail of a front towbar end connector used in each of the individual towbars shown in FIG. 1.
Figure 4:
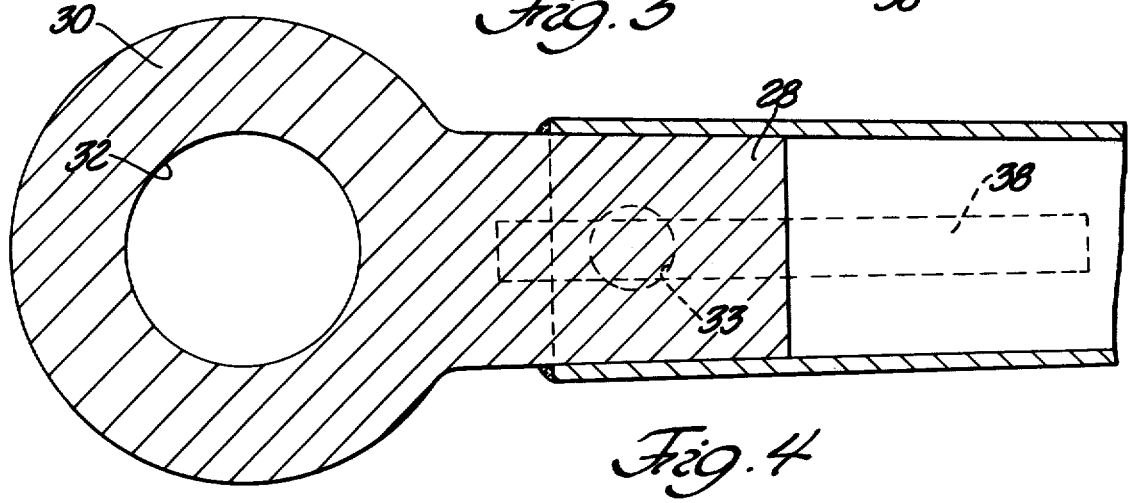

Elongated tube 22 is of circular cross section except at the end areas thereof that receive the eye members 24 and 26. As best shown in FIGS. 3 and 4, front eye member 24 comprises a flat steel plate 29 configured to include a spade portion 28 extending into the front end of tube 22, and an exposed doughnut portion 30 located outside tube 22. The eye is formed by a circular opening 32 extending between major faces 34 and 36 of the plate. Tube 22 is tapered and partially flattened at its forward end to facially engage major plate faces 34 and 36; welding procedures are used to affix plate 29 to the tube. As shown, the welding may be performed around joint 31 between the tube mouth and plate 29, and also in circular access openings 33 formed in the flattened wall areas of the tube. The plate-tube connection may be reinforced against bending in planes normal to the plate by means of a reinforcement gusset 38 that extends along face 36 of the plate and the flattened area of tube 22. Gusset 38 is welded to plate face 36 and the flattened area of the tube.

The area of plate surface 36 that surrounds opening 32 has a transverse arcuate contour, whereas the corresponding area of plate surface 34 is flat, thus giving the doughnut a semi-circular transverse cross-section.

Figure 5:
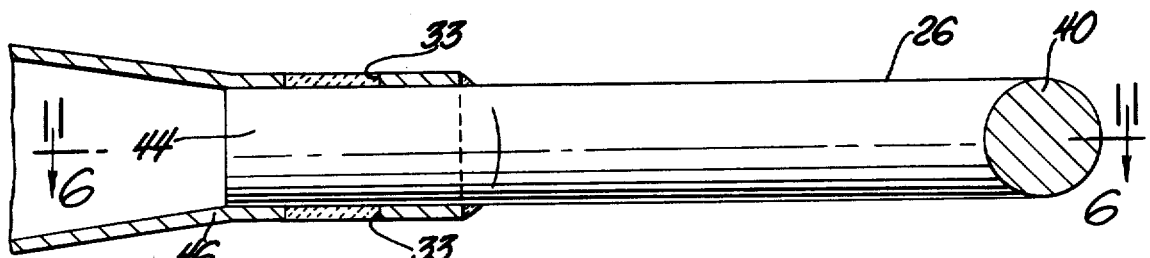
FIGS. 5 and 6 illustrate structural detail of the rear towbar end connector used in each of the FIG. 1 towbars.
Figure 6:
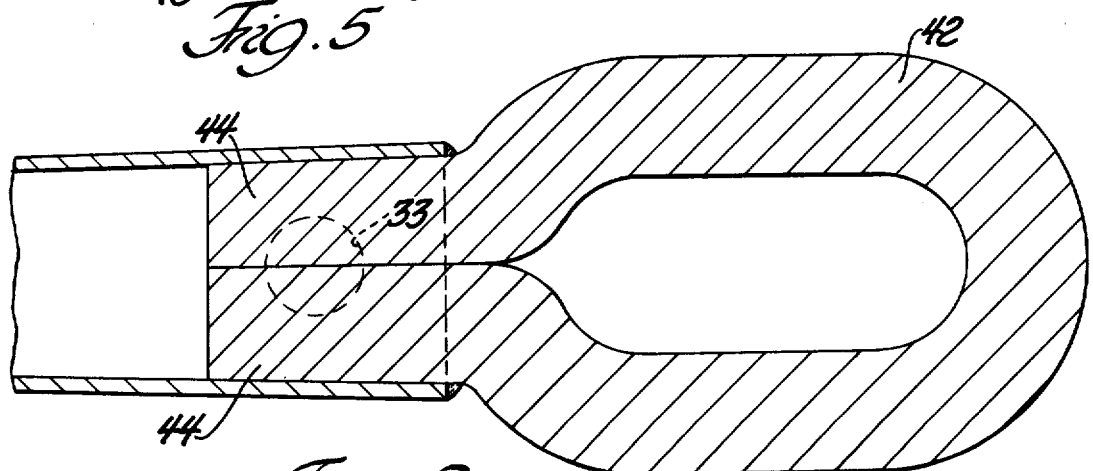

Referring to FIGS. 5 and 6, each rear eye member 26 is formed by a steel rod 40 having an exterior loop section 42 and parallel end sections 44 extending into flattened end portion 46 of tube 22. The eye member is affixed to the tube by welding.

Figure 7:
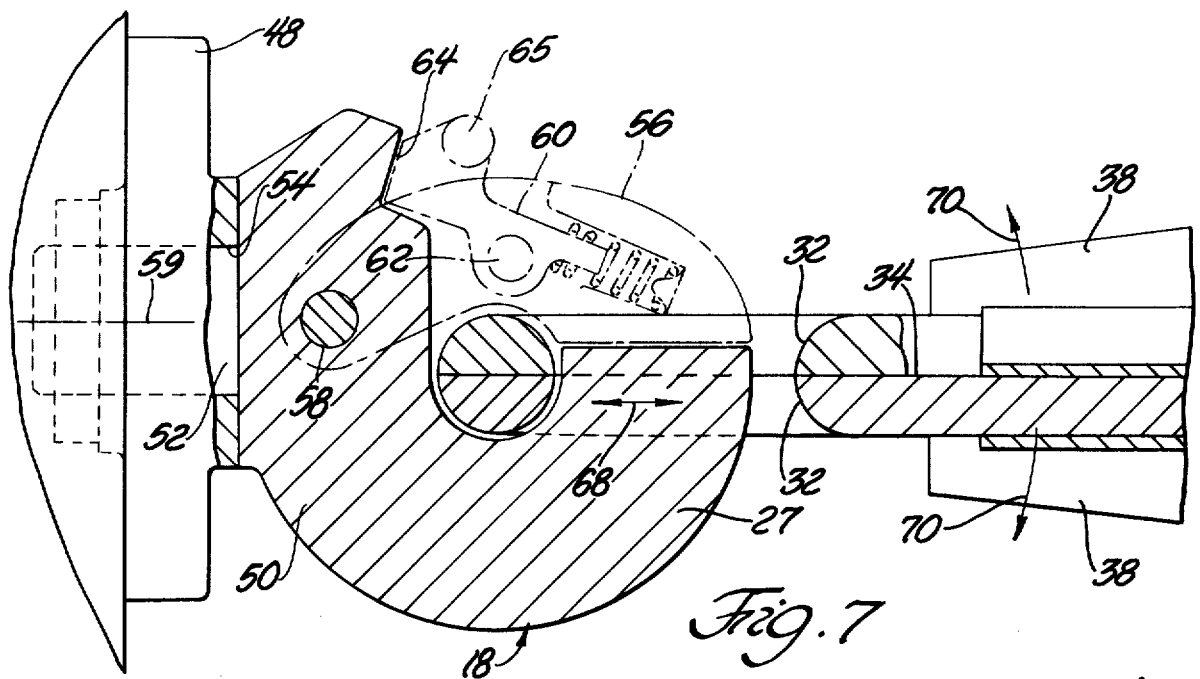
FIG. 7 shows in some detail the connection arrangement between the towing vehicle and towbar assembly pictured in FIG. 1.

The aforementioned towing pintle 18 (FIG. 1) is of conventional construction. As shown in FIG. 7, the towing pintle includes a mounting plate 48 welded or bolted to the vehicle, a U-shaped member 50 having a shaft extension 52 swivel mounted in a circular bore 54 in member 50, and a pintle closure member 56 connected to member 50 by means of a transverse pivot pin 58. The pintle can rotate around shaft axis 59 to accommodate roll motions and changes in roll attitude between the towing vehicle and towed vehicle.

Closure member 56 is provided with a manually-operable latch 60 swingable around a transverse pivot 62. In its illustrated position latch 60 abuts shoulder 64 on member 50 to retain closure member 56 in a locked position. Clockwise pull on handle portion 65 of the latch around pivot 62 disengages the latch from shoulder 64, thus enabling member 56 to be swung in a counterclockwise arc around pin 58 for obtaining access to pin 27. Pin 27 has essentially a circular cross section of appreciable diameter to provide the necessary strength for withstanding towbar loads in the arrow 68 direction. The bight space between pin 27 and the base area of member 50 is relatively short, e.g., about 1¾ inches, to minimize undesired cantilever effects.

As noted above, pintle assembly 18 is of a conventional known design now used in U.S. Army vehicles, e.g., the M-60 tank. We have designed our towbars especially to fit this standard pintle design. As shown fragmentarily in FIG. 7, the individual towbars are arranged so that the front eye members 24 overlap one another when the circular openings 32, 32 are fitted on the circular cross-sectioned pin 27. The individual towbars are juxtaposed so that the flat faces 34 on the respective plates 29 mate with one another, thus causing the cross-section of the doughnut assembly to be circular. The doughnut cross section is sized to substantially fill the bight space between pin 27 and the base area of member 50 without binding between the pintle and either towbar. In this connection, it will be appreciated that the towbars should be free for vertical swing motions, as designated by arrows 70; the towbars should also be free to swing in side-to-side directions to accommodate vehicle turn maneuvering. The side-to-side motions and vertical swing motions sometimes occur simultaneously. By providing a circular transverse cross-section on the doughnut assembly, i.e. the overlapped eye members, it is possible to accommodate the desired towbar motions while at the same time achieving a force loading line-of-action that is substantially along the towbar axis for each towbar. The symmetry of the towbar assembly relative to the common pulling point 27 causes the individual towbars to have substantially the same loading. The loads in each case are essentially in the tube's axial direction so that bending loads are minimal. Tubes 22 can thus have a reduced wall thickness and lowered weight.

Figure 8:
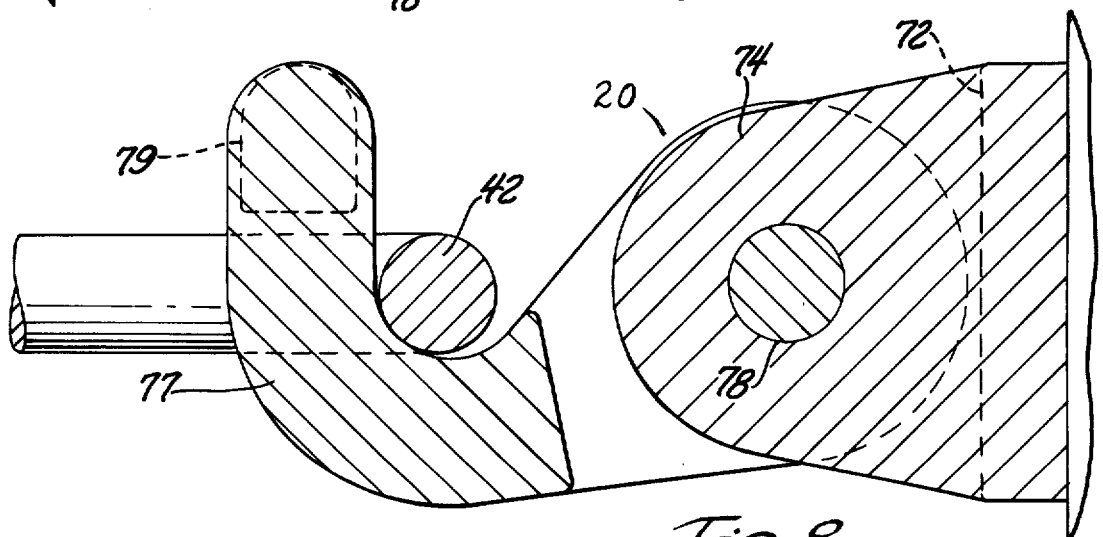
FIGS. 8 and 9 show details of the connection system between the FIG. 1 towbar and towed vehicle.
Figure 9:
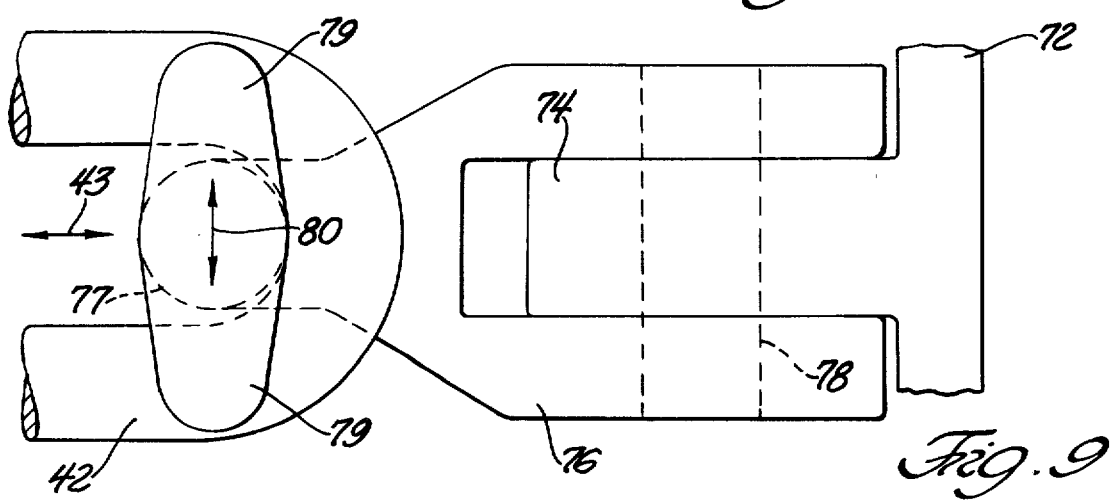

The rear end of each towbar can be anchored to the towed vehicle in various ways. FIGS. 8 and 9 show an anchorage mechanism that has been used on military vehicles; the rear end connector on our towbar (FIGS. 5 and 6) is designed for use with this specific anchorage mechanism. Mechanism 20 includes a base 72 having a forwardly-projecting wall 74 that fits within the U-section 76 of a hook structure 77; a transverse connector pin 78 allows the hook structure to swing around the pin 78 axis. The tip end of hook structure 77 is equipped with laterally-extending wings 79 that overlie the loop portion 42 of the towbar end connector when it is in its operative position. To initially connect the towbar to hook 77 it is necessary to orient the towbar at right angles to the plane of the hook so that the long dimension 43 of the loop 42 space registers with the long dimension 80 of wings 79; after the towbar is moved to lower its loop 42 onto hook 77 the towbar can be swung to its FIG. 1 operative position. The towbar is connected to the towed vehicle first, i.e., before connection to the towing vehicle.

The structure of hook mechanism 20 enters into our invention only in the sense that we have devised the cooperating towbar end connector to fit the hook structure without any intervening clevis members or articulation devices that would add to system complexity and/or serve as weak zones in the towbar system. Our towbar system is operable in spite of possible variations in spacing between hook mechanisms 20 from one vehicle to another.

Figure 2:
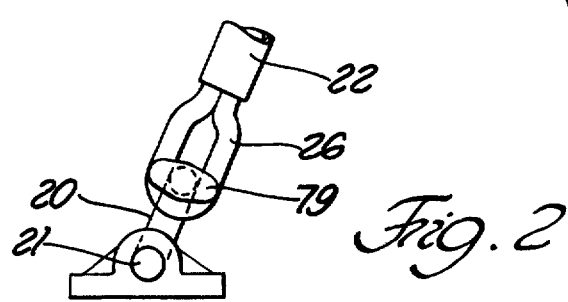
FIG. 2 is a fragmentary view illustrating an alternate towbar-vehicle connection detail that may be used between an individual towbar and towed vehicle.

FIG. 2 illustrates a variant form that hook mechanism 20 could take. In this case the U-shaped hook includes a vertical shaft 21 that enables the hook to swing in a horizontal arc, thereby enabling the towbar force line of action to pass through shaft 21 and thus provide a lessened bending load on the hook mechanism.

A major feature of our invention is the construction of the towbar front connector shown in FIGS. 3 and 4, which enables two towbars to be connected to a common pintle pin 27 in the fashion shown in FIG. 7. The individual towbars are capable of being substantially equally loaded because of their symmetrical orientation to the pintle pin 27. At the same time the individual towbars are not rigidly or permanently fixed to one another, as by cross braces, welding or the like. Therefore each towbar acts independently in essentially pure tension or compression; one towbar does not apply oblique loads to the other towbar, as might produce a bending action. When the vehicles are both moving in the straight-ahead direction, the towbars are each loaded in tension. Should the towing vehicle execute a turning maneuver, the towbar at the inner side of the turn will experience a compression loading, whereas the other towbar will continue to be in tension. The separate connections of the respective towbars to the towing pintle serves to preclude undesired bending loads in either towbar.

There are ancillary benefits in making the towbars separate from one another. Thus, by making the towbars separable we achieve ease of handling, due to the low weight of each individual towbar. The separable towbars also have advantages in regard to low storage space requirements. Some economies in inventory requirements are possible because each towbar has the same construction; each towbar is interchangeable with the other.

We wish it to be understood that we do not desire to be limited to the exact details of construction shown and described for obvious modifications will occur to a person skilled in the art.

We claim:

1. A towbar comprising an elongated tube, a front eye member affixed to one end of the tube, a rear eye member affixed to the other end of the tube; said front eye member comprising a flat plate having a spade portion extending into the tube, and a doughnut portion located outside the tube; said doughnut portion having a circular opening therethrough defining the front eye; the front end area of the tube being partially flattened so that its interior surfaces facially engage the opposite major faces of the spade portion; and a reinforcement gusset extending along one major face of said plate and partially flattened area of the tube to rigidify the tube-eye member connection against bending in a plane normal to the eye member plate.

2. The towbar of claim 1 wherein the doughnut portion of the flat plate has a semi-circular cross section.

3. The towbar of claim 2 wherein the curved surface of the semi-circular cross section doughnut is formed on the face of the plate that is engaged with the reinforcement gusset.

4. A towbar assembly comprising two individual towbars adapted to take a V-configuration between an upwardly-facing pintle on a towing vehicle, and two laterally-spaced hooks on a towed vehicle; each towbar including a front eye member having a circular opening sized to fit over the pintle; the front eye members for the respective towbars having flat surfaces engageable with one another so that the eye members can overlap one another when the eye members are simultaneously fitted onto the pintle.

5. The towbar assembly of claim 4; the front eye member on each towbar comprising a flat plate that includes a doughnut portion, said doughnut portion having a semi-circular cross section, the towbars having their front eye members arranged with the doughnut portion semi-circular cross sections joined together to define a circular cross section assembly.

6. The towbar assembly of claim 5 wherein the towbars are identical to one another.

7. The towbar assembly of claim 6 wherein each towbar includes an elongated tube constituting the major portion of the towbar length, the aforementioned front eye member comprising a flat plate having a spade portion extending into the tube, and a doughnut portion located outside the tube; each doughnut portion having a circular opening therethrough sized to fit the aforementioned pintle; the front end area of each tube being partially flattened so that its interior surfaces facially engage the opposite major faces of the spade portion; and a reinforcement gusset extending along one major face of said plate and partially flattened area of the tube to rigidify the tube-eye member connection against bending in a plane normal to the eye member plate.

* * * * *